(12) United States Patent
Gzik

(10) Patent No.: US 6,382,270 B1
(45) Date of Patent: May 7, 2002

(54) DEVICE FOR PREVENTING THE INTRODUCTION OF A FUEL NOZZLE

(75) Inventor: Herbert Gzik, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/920,067

(22) Filed: Aug. 1, 2001

(30) Foreign Application Priority Data

Aug. 3, 2000 (DE) .......................................... 100 37 824

(51) Int. Cl.⁷ ............................ B65B 1/30; B65B 31/00; B67C 3/02
(52) U.S. Cl. ........................... 141/94; 141/83; 141/350; 141/351; 220/86.2
(58) Field of Search ............................. 141/83, 94, 98, 141/349, 350, 351, 301, 311 R, 390; 220/86.2; 137/384.2; 251/149.6

(56) References Cited

U.S. PATENT DOCUMENTS 4,195,673 A * 4/1980 Johnston et al. ............ 141/349
4,469,149 A * 9/1984 Walkey et al. ................ 141/94
4,838,323 A * 6/1989 Watts ............................. 141/1
5,725,033 A    3/1998 Steinkaemper et al.
5,791,387 A    8/1998 Palvölgyi
6,302,169 B1 * 10/2001 Pulos .......................... 141/301

FOREIGN PATENT DOCUMENTS

| DE | 36 41 274 | 6/1987 |
| DE | 40 02 750 | 5/1990 |
| DE | 42 17 966 | 5/1993 |
| DE | 196 39 825 | 4/1997 |
| EP | 0 298 464 | 1/1989 |

* cited by examiner

Primary Examiner—Timothy L. Maust
(74) Attorney, Agent, or Firm—Kenyon & Kenyon

(57) ABSTRACT

A device for preventing the introduction of a fuel nozzle for unleaded fuel into the filler neck of a fuel tank of a motor vehicle fitted with a diesel internal combustion engine includes at least one opening element and at least one blocking element for blocking the filler neck are arranged in the filler neck. The blocking element in its rest position blocks the filler neck, and, when a fuel nozzle for diesel fuel is introduced into the filler neck, the at least one opening element produces a signal for opening the blocking element.

9 Claims, 2 Drawing Sheets

DEVICE FOR PREVENTING THE INTRODUCTION OF A FUEL NOZZLE

FIELD OF THE INVENTION

The invention relates to a device for preventing the introduction of a fuel nozzle for unleaded fuel into the filler neck of a fuel tank of a motor vehicle fitted with a diesel internal combustion engine.

BACKGROUND INFORMATION

German Published Patent Application Nos. 36 41 274 and 196 39 825 disclose refueling blocks for the filler necks of fuel tanks, which can be used to prevent the introduction of fuel nozzles for leaded fuel or for diesel fuel in motor vehicles which must be refueled exclusively with lead free fuel.

Refueling blocks of this type have been well-established for many years and are still being used to reliably prevent damage to internal combustion engines or catalytic converters of such motor vehicles. However, it should be noted that blocks of this type are relatively simple to construct, since the fuel nozzles for unleaded fuel have a smaller diameter than the fuel nozzles for leaded fuel or for diesel fuel, and therefore introduction of the abovementioned fuel nozzles is in principle already prevented.

It is, however, precisely the other way around in the case of motor vehicles having diesel internal combustion engines, and so unleaded fuel can be supplied without any problem to such vehicles from fuel nozzles having a relatively small diameter. In the case of conventional diesel internal combustion engines which operate in accordance with the precombustion chamber principle this is not a problem which needs to be taken seriously and particularly in winter the addition of up to 30% petrol to the diesel fuel is even recommended so as to prevent the diesel fuel "becoming sludgy" at low temperatures.

However, what is not a problem in the older precombustion chamber diesel internal combustion engines may lead to considerable damage in the case of the common-rail diesel internal combustion engines which are ever more frequently to be found, since the high-pressure pump of such internal combustion engines requires the diesel fuel in order to lubricate it. If a relatively large amount of petrol, in particular unleaded petrol, is then placed in such diesel internal combustion engines, insufficient lubrication may very rapidly occur in the high-pressure pump, with the result that the latter becomes blocked and further operation of the internal combustion engine is not possible. In actual fact, this has already led to broken-down vehicles along with the trouble associated therewith.

SUMMARY

Therefore, it is an object of the present invention to provide a device which is used in motor vehicles fitted with a diesel internal combustion engine to prevent fuel nozzles for unleaded fuel from being able to be introduced into the filler neck.

The blocking element according to the present invention is provided to prevent the introduction of a fuel nozzle into the filler neck leading to the fuel tank. Only when the at least one opening element which interacts with the blocking element produces an appropriate signal does the blocking element open and release the access to the filler neck. This result may occur, however, only when a fuel nozzle for diesel fuel is introduced, and the introduction of a fuel nozzle for unleaded fuel, and therefore the refueling of the fuel tank with unleaded fuel, is thereby substantially prevented.

In accordance with the present invention, it is not possible for unleaded fuel to be filled into a motor vehicle having a diesel internal combustion engine, which ensures reliable functioning of diesel internal combustion engines, particularly those operating in accordance with the common-rail principle. One particular advantage of the present invention is that existing fuel nozzles do not have to be retrofitted, as was the case, for example, when unleaded fuel was introduced.

One very functionally reliable configuration of the invention which may be realized with little structural outlay may be produced if there are arranged on the inner circumference of the filler neck at least two opening elements which project into the filler neck and are at such a distance from one another that a fuel nozzle which is introduced into the filler neck and is intended for unleaded fuel does not touch at least one of the opening elements, and in that a fuel nozzle which is introduced into the filler neck and is intended for diesel fuel touches all of the opening elements, in which case, when all of the opening elements are simultaneously touched, the opening elements produce a signal for opening the blocking element.

The at least two opening elements may be configured as contact sensors which produce an electric signal for opening the blocking element. An arrangement of this type which is equally simple and may be converted cost effectively may also be retrofitted in already existing motor vehicles, in which case very reliable functioning would be provided at the same time due the electronically operating contact sensors.

Alternatively, the at least two opening elements may also be configured as projections which protrude into the filler neck and whose distance from one another would be greater than the outer diameter of a fuel nozzle for unleaded fuel, in which case the projections, when touched by a fuel nozzle for diesel fuel, would release the blocking element. This arrangement may also be usable as retrofitted solution and would ensure functioning even independently of a power supply.

DETAILED DESCRIPTION

Figure 1:
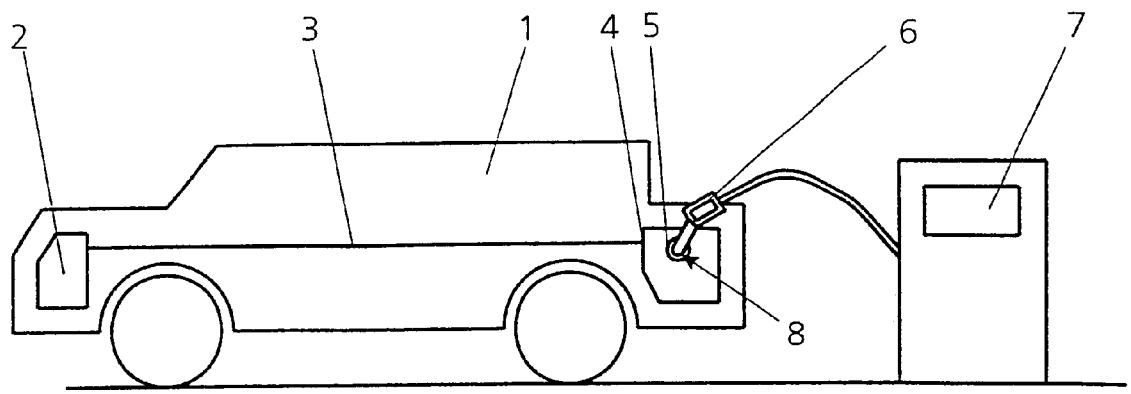
FIG. 1 is a schematic view of a motor vehicle having an internal combustion engine and a fuel tank connected to the internal combustion engine.

FIG. 1 schematically illustrates a motor vehicle 1 having a diesel internal combustion engine 2 which operates in the present case in accordance with the common-rail principle. A fuel tank 4 is connected to the diesel internal combustion engine 2 via a fuel line 3. The fuel tank 4 is provided in a conventional manner with a filler neck 5 via which the fuel tank 4 may be filled with diesel fuel from a fuel pump 7 by a fuel nozzle 6.

Figure 2:
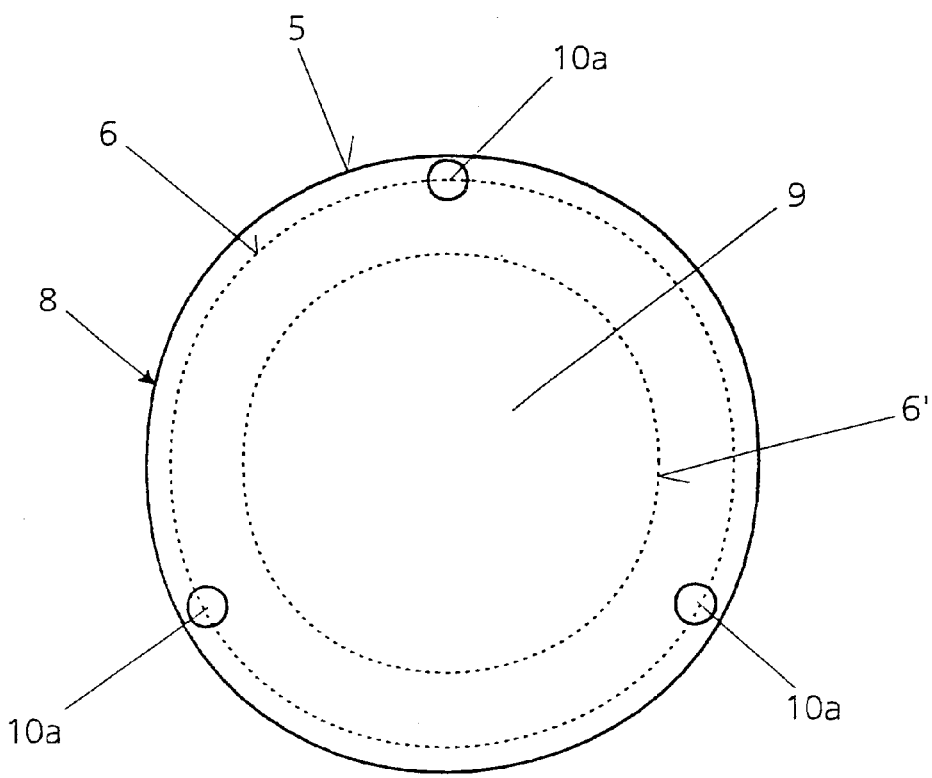
FIG. 2 illustrates a first example embodiment of a device according to the present invention.

In order to prevent the introduction of a fuel nozzle 6' for unleaded fuel into the filler neck 5 of the fuel tank 4, a device 8 is accommodated in the filler neck 5 of the fuel tank 4, a first example embodiment of which device is illustrated in greater detail in FIG. 2.

The device 8 illustrated in FIG. 2 includes a blocking element 9 which closes the filler neck 5 and in its rest position prevents the introduction both of the fuel nozzle 6 for diesel fuel and the introduction of fuel nozzles 6' for unleaded fuel, which, as is conventional, have a smaller outer diameter. There are arranged on the inner circumference of the filler neck 5, in the present case on the blocking element 9, three opening elements 10 which project into the filler neck 5 and are configured in the illustrated example embodiment as contact sensors 10a.

The contact sensors 10a are at such a distance from one another that a fuel nozzle 6' which is introduced into the filler neck 5 and is intended for unleaded fuel does not touch at least one of the contact sensors 10a. As a result, opening of the blocking element 9 is not possible, and the fuel nozzle 6 may therefore be introduced into the filler neck 5 only as far as the blocking element 9, which prevents the fuel tank 4 from being filled with unleaded fuel. The diameter of the fuel nozzle 6' for unleaded fuel is illustrated by the inner circle of dashed lines in FIG. 2.

If, however, the fuel nozzle 6 for diesel fuel is introduced into the filler neck 5, then its larger diameter, which is indicated by the outer dashed line, results in the fuel nozzle touching all of the opening elements 10 which, when touched simultaneously, produce a signal for opening the blocking element 9. Due to the configuration of the opening elements 10 as contact sensors 10a the signal in this case is an electric signal which may, for example, ensure that the blocking element 9 is folded away into the interior of the filler neck 5. For this purpose, the blocking element 9 may be configured as a flap. Alternatively, the blocking element 9 may also be configured as a slide and may be moved away in the radial direction.

Instead of the three opening elements 10 illustrated, just two opening elements 10 may be provided, it being necessary to ensure in each case that the fuel nozzle 6' for unleaded fuel cannot simultaneously touch both opening elements 10, but the fuel nozzle 6 for diesel fuel would always touch all of the opening elements 10. If this condition is satisfied, any other number of opening elements 10 may also be possible. This principle also applies to the example embodiment of the device 8 described below.

Figure 3:
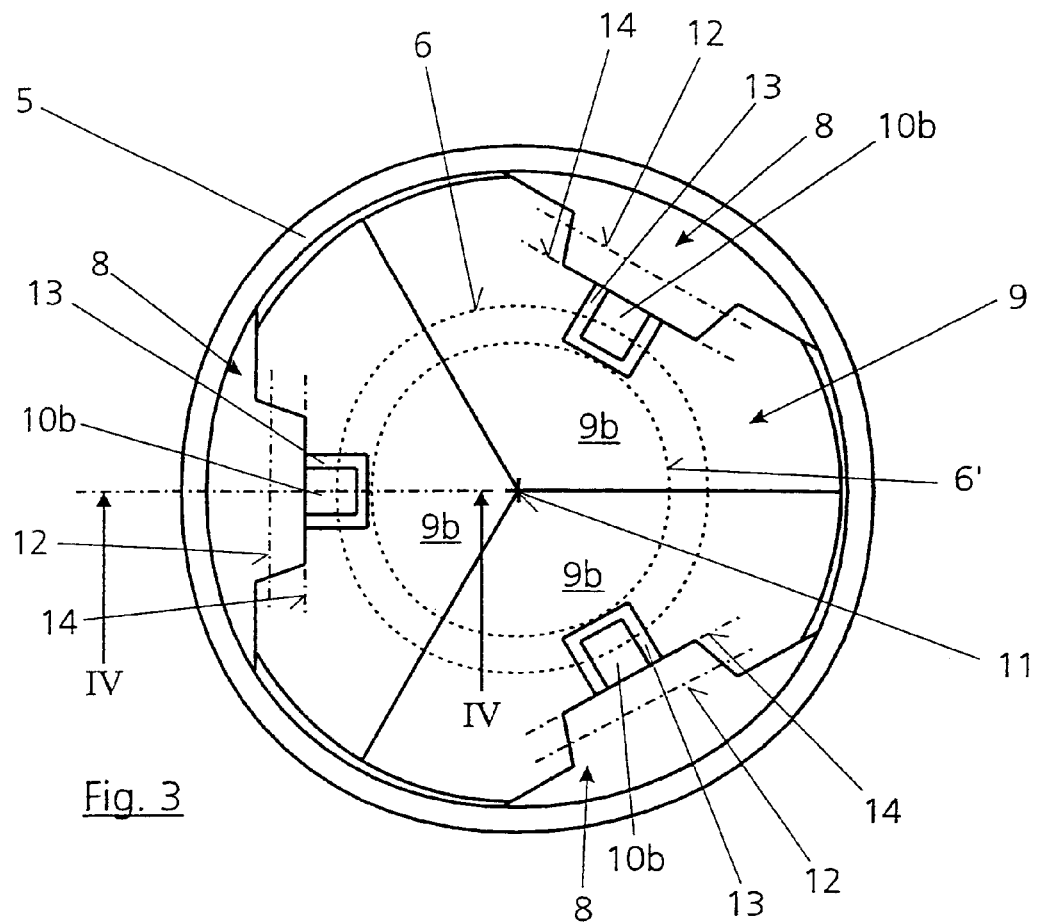
FIG. 3 illustrates a second example embodiment of a device according to the present invention.
Figure 4:
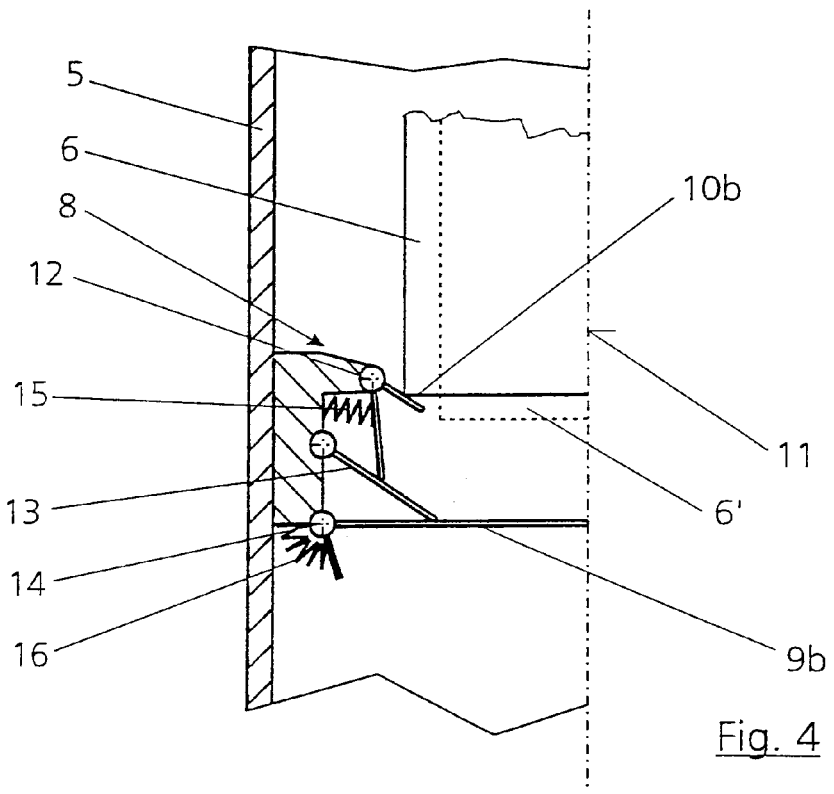
FIG. 4 is a cross-sectional view of the device illustrated in FIG. 3 taken along the line IV—IV.

FIGS. 3 and 4 schematically illustrate another example embodiment of the device 8 with three opening elements 10 being provided on the inner circumference of the filler neck 5. These opening elements 10 are configured as projections 10b which protrude into the filler neck 5 and whose distance with respect to one another is again larger than the outer diameter of the fuel nozzle 6' for unleaded fuel, and which are arranged in the present case offset with respect to one another by 120° in each case. Again, the diameter of the fuel nozzle 6' for unleaded fuel and the diameter of the fuel nozzle 6 for diesel fuel are illustrated as circles of dashed lines having a small and large diameter, respectively.

If the fuel nozzle 6, as illustrated in FIG. 4, is introduced into the filler neck 5, then it presses simultaneously onto the three projections lob which each pivot as a result about an axis 12 extending perpendicularly to a central axis 11 of the filler neck 5. The blocking element 9 is divided into three segments 9b of the same size and one segment 9b in each case is assigned to one of the projections 10b via an outwardly protruding lever element 13. Each individual projection 10b presses onto the assigned lever element 13 which in this manner ensures that the segments 9b pivot about an axis 14 likewise extending perpendicularly to the central axis 11. By this pivoting of the segments 9b, the filler neck 5 is released for the fuel nozzle 6. The projections 10b and the lever elements 13 are held in their closed position by spring elements 15 and 16, respectively, as a result of which the device 8 returns to its blocking position when the fuel nozzle 6 is removed.

It may be seen that the fuel nozzle 6' for unleaded fuel cannot simultaneously touch all three projections 10b and for this reason it is not possible to introduce a fuel nozzle 6' of this type into the filler neck 5.

In another example embodiment of the present invention, a single opening element 10 may be arranged on the inner circumference of the filler neck 5, which opening element, for example by inducing a magnetic field, detects the diameter of the fuel nozzle 6 and if the diameter is correct releases the filler neck 5 by removing the blocking element 9, for example by an electric signal.

What is claimed is:

1. A device for preventing introduction of a fuel nozzle for unleaded fuel into a filler neck of a fuel tank of a motor vehicle including a diesel internal combustion engine, the device comprising:

at least one opening element arranged in the filler neck; and at least one blocking element configured to block the filler neck when disposed in a rest position, the at least one blocking element being arranged in the filler neck;

wherein the at least one opening element is configured to produce a signal for opening the blocking element in response to an introduction into the filler neck of a fuel nozzle for diesel fuel.

2. The device according to claim 1, wherein at least two opening elements are arranged on an inner circumference of the filler neck, the at least two opening elements projecting into the filler neck, the at least two opening elements being separated by a distance so that the fuel nozzle for unleaded fuel that is introduced into the filler neck does not touch at least one of the opening elements and so that the fuel nozzle for diesel fuel introduced into the filler neck touches all of the opening elements;

and wherein the opening elements are configured to produce the signal for opening the blocking element in response to simultaneous touching of all of the opening elements.

3. The device according to claim 2, wherein the at least two opening elements are configured as contact sensors, the contact sensors being configured to produce an electric signal for opening the blocking element.

4. The device according to claim 1, wherein at least two opening elements are configured as projections protruding into the filler neck, a distance between the at least two opening elements being greater than an outer diameter of the fuel nozzle for unleaded fuel, the projections being configured to release the blocking element in response to being touched by the fuel nozzle for diesel fuel.

5. The device according to claim 4, wherein the projections are configured to pivot about a pivot axis in response to being touched by the fuel nozzle for diesel fuel, the pivot axis being arranged substantially perpendicular to an axis of the filer neck, the blocking element being divided into a plurality of segments, each segment corresponding to a respective projection; and wherein the pivoting of the projections is configured to cause the segments to pivot about an axis arranged perpendicular to the pivot axis so that the blocking element releases the filler neck.

6. The device according to claim 5, wherein the segments are configured to engage with the projections via outwardly protruding lever elements.

7. The device according to claim 6, further comprising spring elements configured to maintain the projections and the lever elements in a closed position.

8. The device according to claim 4, wherein three projections are arranged approximately uniformly on the inner circumference of the filler neck, the device including lever elements corresponding to the projections;

and wherein the blocking element is divided into three segments.

9. The device according to claim 1, wherein the opening element is arranged on an inner circumference of the filler neck, the opening element being configured to detect a diameter of the fuel nozzle by inducing a magnetic field and to release the blocking element in response to a detected predetermined diameter.

* * * * *